(12) United States Patent
Deboer et al.

(10) Patent No.: US 11,110,554 B2
(45) Date of Patent: Sep. 7, 2021

(54) GARNISH INSTALLING APPARATUS AND METHODS OF MAKING AND USING THE SAME

(71) Applicant: Honda Motor Co., Ltd., Tokyo (JP)

(72) Inventors: Benjamin Douglas Deboer, Ontario (CA); Benjamin B. MacArthur, Ontario (CA)

(73) Assignee: HONDA MOTOR CO., LTD., Tokyo (JP)

( * ) Notice: Subject to any disclaimer, the term of this patent is extended or adjusted under 35 U.S.C. 154(b) by 143 days.

(21) Appl. No.: 16/516,858

(22) Filed: Jul. 19, 2019

(65) Prior Publication Data

US 2021/0016398 A1  Jan. 21, 2021

(51) Int. Cl.
 *B23P 19/02* (2006.01)
 *B23P 19/04* (2006.01)
 *B25B 27/00* (2006.01)
 *B60J 10/00* (2016.01)

(52) U.S. Cl.
 CPC ............... *B23P 19/02* (2013.01); *B60J 10/45* (2016.02); *B23P 19/047* (2013.01); *B25B 27/0092* (2013.01)

(58) Field of Classification Search
 CPC ......... B25P 19/02; B25P 19/042; B60J 10/45; B25B 27/0092
 See application file for complete search history.

(56) References Cited

U.S. PATENT DOCUMENTS

| | | | |
|---|---|---|---|
| 5,693,174 A * | 12/1997 | Nakata | B29D 99/0053 156/361 |
| 5,735,032 A | 4/1998 | Stone | |
| 6,311,378 B1 * | 11/2001 | Menguc | B23P 19/047 29/235 |
| 8,033,004 B2 | 10/2011 | Kondo et al. | |
| 8,146,228 B2 | 4/2012 | Kondo et al. | |
| 8,336,184 B2 | 12/2012 | Yamamoto et al. | |
| 2005/0257380 A1 | 11/2005 | Karl et al. | |

FOREIGN PATENT DOCUMENTS

| | | |
|---|---|---|
| FR | 2996156 A1 | 4/2014 |
| FR | 3042773 A1 | 4/2017 |
| GB | 2273516 A | 6/1994 |

* cited by examiner

*Primary Examiner* — Christopher J Besler
(74) *Attorney, Agent, or Firm* — Kenealy Vaidya LLP

(57) ABSTRACT

A garnish installing apparatus can include a housing, a static guide roller, and adjustable guide roller and a pressure assembly. The housing can include a housing body and an extension mechanism that is movable relative to the housing body. The extension mechanism can include a pneumatic cylinder. The static guide roller can be attached to the housing. The adjustable guide roller can be attached to the extension mechanism. The adjustable guide roller can be configured to provide a clamping force, with the static guide roller, on a door of a vehicle. The pressure assembly can be configured to apply pressure and detect application of pressure to a garnish of the door. The pressure assembly can include a pneumatic sensor.

14 Claims, 5 Drawing Sheets

GARNISH INSTALLING APPARATUS AND METHODS OF MAKING AND USING THE SAME

BACKGROUND

The disclosed subject matter relates to systems and methods for attaching a trim garnish to a vehicle door.

Vehicles can be provided with one or more doors. Each of these doors can include a door trim (also referred to as a door garnish or a door trim garnish) that completely or partially covers a peripheral edge of the door sash (also referred to as a window frame or a door frame) of the door. For example, the garnish can be in the form of or include a weatherstrip. Such a weatherstrip can provide a seal between the door of the vehicle and the side of the vehicle that surrounds the door opening. The garnish can be attached to the door using various methods and mechanisms. For example, the garnish can include snap fasteners that are attached or integrated with the garnish. The door can include holes or apertures to receive the snap fasteners. The garnish can be mounted to the door by inserting the snap fasteners into the respective apertures in the door.

SUMMARY

Some embodiments are directed to a garnish installing apparatus can include a housing, a static guide roller, and adjustable guide roller and a pressure assembly. The housing can include a housing body and an extension mechanism that is movable relative to the housing body. The extension mechanism can include a pneumatic cylinder. The static guide roller can be attached to the housing. The adjustable guide roller can be attached to the extension mechanism. The adjustable guide roller can be configured to provide a clamping force, with the static guide roller, on a door of a vehicle. The pressure assembly can be configured to apply pressure and detect application of pressure to a garnish of the door. The pressure assembly can include a pneumatic sensor.

Some embodiments are directed to a garnish installing apparatus that can include a housing, at least one static guide roller, at least one adjustable guide roller, a pressure assembly and a controller. The housing can include a housing body and an extension mechanism that is movable relative to the housing body. The at least one static guide roller can be attached to the housing. The at least one adjustable guide roller can be attached to the extension mechanism. The at least one adjustable guide roller can be configured to apply a clamping force, with the at least one static guide roller, on a door of a vehicle. The pressure assembly can be configured to apply pressure and detect application of pressure to a garnish of the door. The pressure assembly can include at least one pressure sensor and a block. The at least one pressure sensor can be supported by the housing body. The block can be supported by the at least one pressure sensor. The block can be configured to physically apply pressure to the garnish. The controller can be configured to control operations of the garnish installing apparatus including detecting an predetermined application of pressure, on the block, as a trigger for providing the clamping force.

Some embodiments are directed to a garnish installing apparatus that can include a housing, a pair of static guide rollers, an adjustable guide roller, a pressure assembly, a handle and a controller. The housing can include a housing body and an extension mechanism that is movable relative to the housing body. The pair of static guide rollers can be attached to the housing body. The adjustable guide roller can be attached to the extension mechanism. The adjustable guide roller can be configured to provide a clamping force, with the pair of static guide rollers, on a door of a vehicle, and the clamping force can be provided by actuation of the extension mechanism. The pressure assembly can be configured to apply pressure and detect application of pressure to a garnish of the door. The pressure assembly can include a first pressure sensor, second pressure sensor and a block. The first pressure sensor and the second pressure sensor can be supported by the housing body. The block that can be supported by the first and second pressure sensors. The block can be configured to physically apply pressure to the garnish. The handle can be provided with a further sensor. The further sensor can be configured to detect operator engagement. The controller can be configured to control operations of the garnish installing apparatus, including detecting a ready state that includes: an application of a predetermined pressure, by the block, to the garnish; and a detection of operator engagement by the further sensor.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

The disclosure provides a garnish installing apparatus that can apply a garnish to a door of a vehicle. The disclosure also provides related methods of making and using such an apparatus.

A problem with known technology relates to the manner in which the garnish is mounted on the door. Specifically, the garnish can be mounted on the door using a manual operation, which is performed by a human operator. In such manual operation, the operator may physically hold the garnish and snap the garnish into the door trim in a step-by-step process going around the door. It should be appreciated that such a process introduces a number of variables that can adversely impact how well the garnish is mounted to the door trim. For example, an operator might push too hard on a particular segment of garnish. As a result, the operator can insert a snap fastener further than was intended. Such can distort the garnish, such as a weatherstrip, and result in discontinuities in the garnish and/or leakage through the vehicle door when the vehicle is ultimately put into operation. For example, an operator might not apply enough pressure on a particular segment of garnish. As a result, the garnish may not be securely fastened to the door and may either fall off or not operate effectively. The apparatuses and methods of the disclosure can address these problems with known technology.

Figure 1:
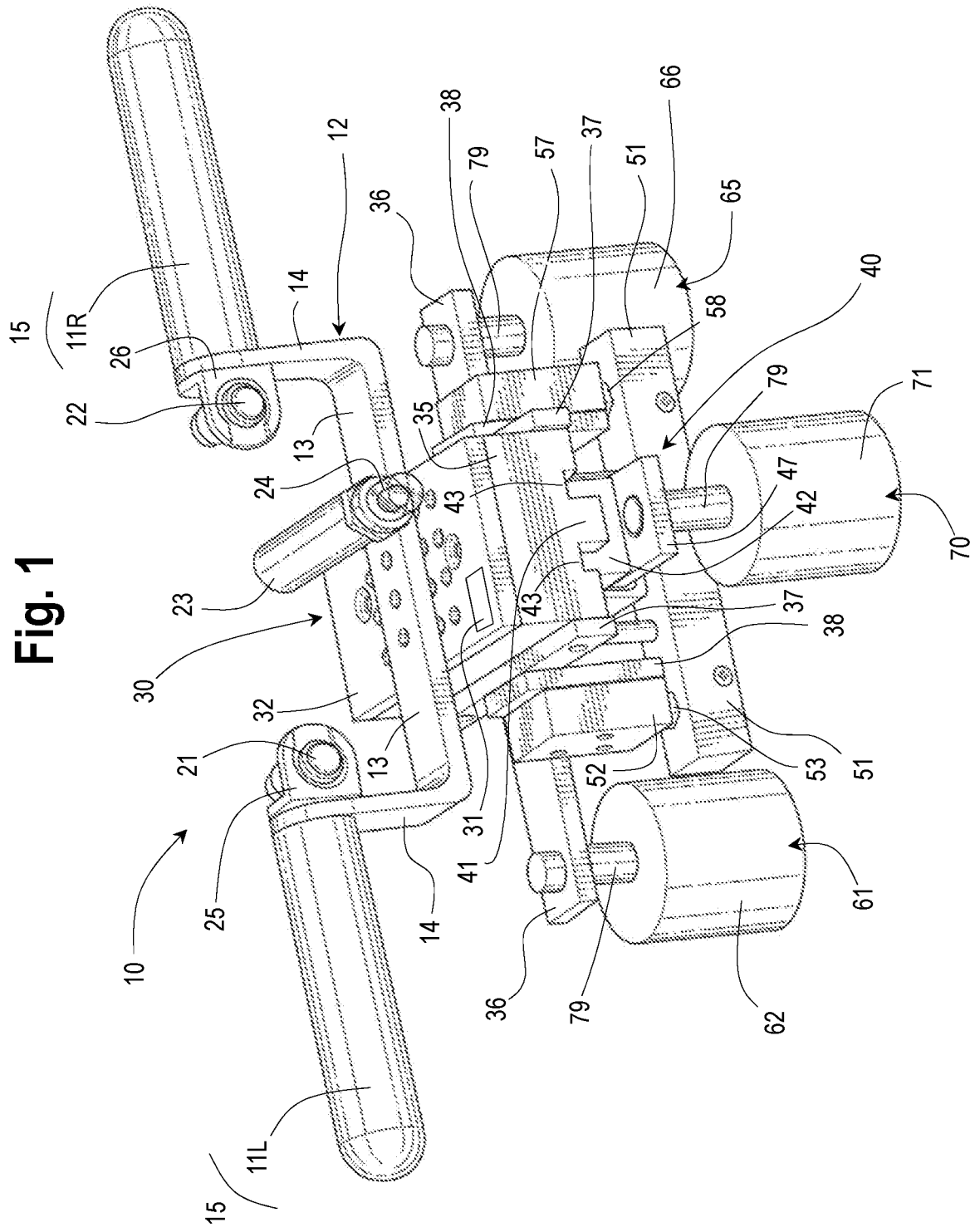
FIG. 1 is a perspective view of a garnish installing apparatus in accordance with principles of the disclosed subject matter.
Figure 2:
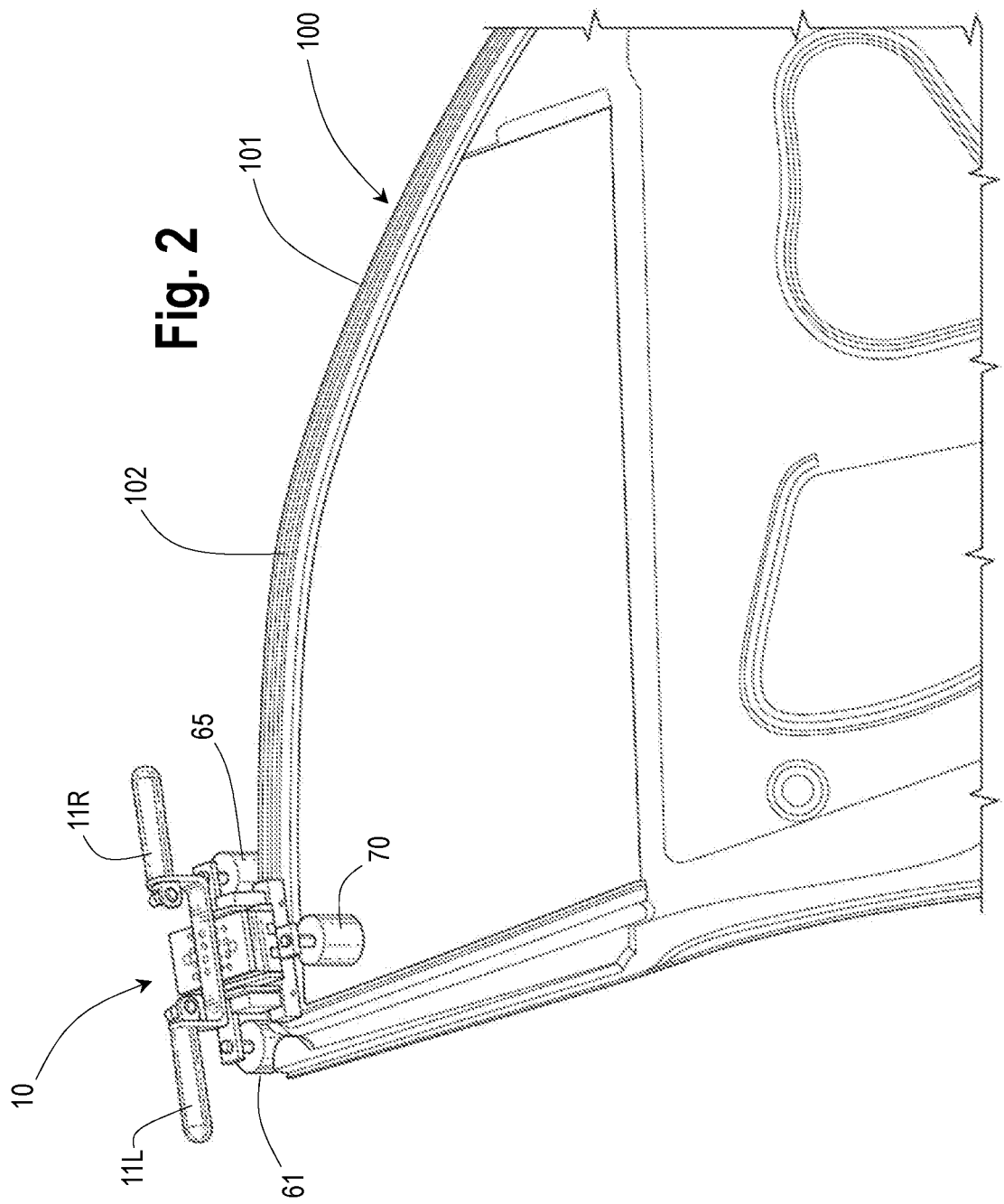
FIG. 2 is a perspective view of the garnish installing apparatus of FIG. 1 in operation on a front door of a vehicle.
Figure 5:
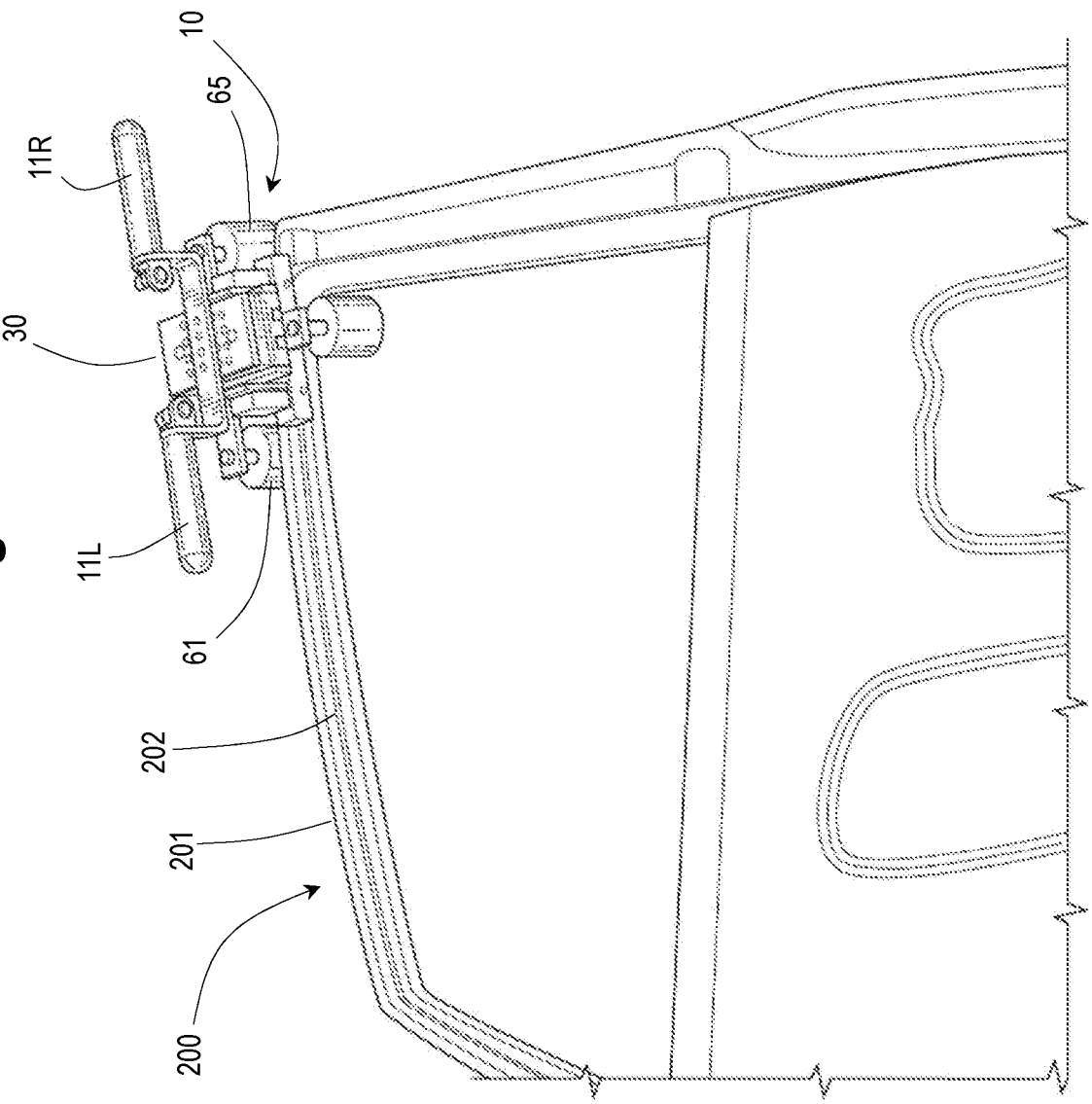
FIG. 5 is a perspective view of the garnish installing apparatus shown in FIG. 1, on a rear door of a vehicle.

Referring to FIGS. 1, 2 and 5 disclosed garnish installing apparatus 10 (also referred to as apparatus 10) can be a device to install door trim garnishes 102, 202 to various doors 100, 200 of a vehicle. The apparatus 10 can be referred to as a jig or tool. The apparatus 10 can install a respective garnish 102, 202 to door sash 101, 201 of both the front door 100 and rear door 200 of a vehicle, for example. The apparatus 10 can be a lightweight handheld device that applies a radius trim to the front and rear doors, 100, 200 of a vehicle. Accordingly, the apparatus 10 may be referred to as a radius garnish installer.

The apparatus 10 can include three rubber roller bearings or guide rollers 61, 65, 70; a center block or center alignment block 51, four pneumatic sensors 21, 22, 52, 57; one or more pneumatic cylinders; and handgrips or handles 11L, 11R. The guide rollers can also be referred to as bearing wheels.

The guide rollers 61, 65 sit on one side of the door 100 and the guide roller 70 sits on another side of the door. For example, as shown in FIG. 2, the guide roller 61, 65 can sit on the outside of an upper portion of the front door 100. The guide roller 70 can be provided on the opposing side of the door, i.e. the inside of an upper portion of the door 100.

The apparatus 30 can include a pressure assembly that includes the sensors 21, 22, 52, 57 and the center alignment block 51. The sensors 21, 22 can be a left-hand button sensor and a right hand button sensor. The other two sensors 52, 57 can be provided to make contact with, support and/or engage the center alignment block 51.

The apparatus 10 can be positioned so as to straddle the door edge with the garnish 102, 202, which is to be mounted, between the center alignment block 51 and the door sash 101, 201. The operator then applies pressure to the apparatus 10 so as to install a first segment of the garnish 102, 202. That is, once the apparatus 10 is properly positioned, with the desired amount of pressure being applied upon the door 100, 200, the apparatus 10 can provide a gripping, compressing, or clamping operation on the door 100, 200. A green pop-up light or ready indicator light 23 can indicate that the apparatus 10 is ready to perform the task. The operator can then push the apparatus 10 along the edge of the door sash 101, 201. As the operator pushes the apparatus 10 along the edge, pressure and position of the center alignment block 51, which is applied upon the garnish 102, can be effectively controlled.

In a situation that the operator does not apply equal force (for example on the door's radius) the pressure sensors 52, 57 will not mate. In other words, the pressure sensors 52, 57 will fail to detect the desired pressure reading and/or the desired position of a physical element within the sensor. In response to the pressure sensors 52, 57 failing to read an appropriate signal, the apparatus 10 will release grip or unclamp from the door 100, 200. Accordingly, the apparatus 10 beneficially requires that equal force must be present as the operator moves the device along the entirety of the door trim 101 to which the garnish 102 is to be applied. The guide rollers 61, 65, 70 can grip the door and effectively apply pressure to the door garnish. The apparatus 10, in such manner, can be used to apply a radius garnish or a radius trim 102, 202 to the door sash 101, 102 of the door 100, 200.

Application of the garnish can be performed without marks or damage to the garnish or the door. The pressure sensors 52, 57 can be in the form of or include block sensors.

FIG. 1 is a perspective view of a garnish installing apparatus in accordance with principles of the disclosed subject matter. The garnish installing apparatus 10 can include a housing 30. The housing 30 can include a housing top 32. The garnish installing apparatus 10 can also include a controller 31 that controls operation of the garnish installing apparatus 10. The controller 31 can be provided within or attached to the housing 30. Alternatively, the controller 31 can be disposed in some other location and spaced from the housing 30. In such situation, the controller 31 can be connected to the various components of the garnish installing apparatus 10 either utilizing wires or wirelessly.

A handle assembly 15 can be attached to the housing 30. For example, the handle assembly 15 can be attached to the housing top 32. The handle assembly 15 can include the left handle 11L, the right handle 11R and a handle support 12. Each of the handles 11L, 11R can be supported by the handle support 12. As shown, the handle support 12 can be U-shaped. The handle support 12 can include a center member 13 that supports two opposing side members 14. The left handle 11L can be attached or supported by one of the side members 14. The right handle 11R can be attached or supported by another of the side members 14.

Each of the handles 11L, 11R can be associated with a respective sensor. The left handle 11L can be associated with a left-hand button sensor 21. The right handle 11R can be associated with a right-hand button sensor 22. The button sensor 21 can be supported by a sensor support 25. The sensor support 25 can be attached to the handle support 12 or to some other suitable structure. The button sensor 22 can be supported by a sensor support 26. The sensor support 26 can be attached to the other side of the handle support 12 or to some other suitable structure. In accordance with at least one embodiment of the disclosure, the button sensors 21, 22 can be positioned so as to engage with an operator's respective thumbs as he or she holds the handles 11L, 11R. Accordingly, the left-hand button sensor 21 provides input to the controller 31 to assure that the operator's left-hand is appropriately engaged with the apparatus 10. The right hand button sensor 22 provides input to the controller 31 to assure that the operator's right-hand is appropriately engaged with the apparatus 10. Accordingly, if an operator should inadvertently lose grip on the apparatus 10, then the operator can disengage his or her thumb from the respective button sensors 21, 22. Accordingly, a ready state of the apparatus 10 will be terminated, as described in further detail below.

The first static guide roller 61 and the second static guide roller 65 can be fixed in their spatial relationship to the housing. The clamping guide roller 70 can be movable toward and away from the housing 30 and the static guide rollers 61, 65. The first static guide roller 61 can include in outer surface 62. The second static guide roller 65 can include in outer surface 66. The static guide rollers 61, 65 can be constructed of rubber or other soft, pliable material. The static guide rollers 61, 65 can engage with and roll along a surface of the door 100, 200. For example, the static guide roller 61, 65 can roll along the door sash 101, 201 of the door 100, 200 in operation of the garnish installing apparatus 10.

Each of the guide rollers 61, 65, 70 can be supported by a respective axle assembly 79. In turn, the axle assemblies 79 can be attached to opposing ends (or opposing portions) of a static guide roller support 36. The support 36 can include a metal bar or rod that extends from the housing 30 and that is attached to the housing 30. The support 36 can be attached to the housing 30 using any suitable arrangement such as welding or mechanical fasteners. Alternatively, a respective support 36 can extend from both sides of the housing 30 and each of such respective supports 36 serve to support the static guide rollers 61, 65.

Figure 3:
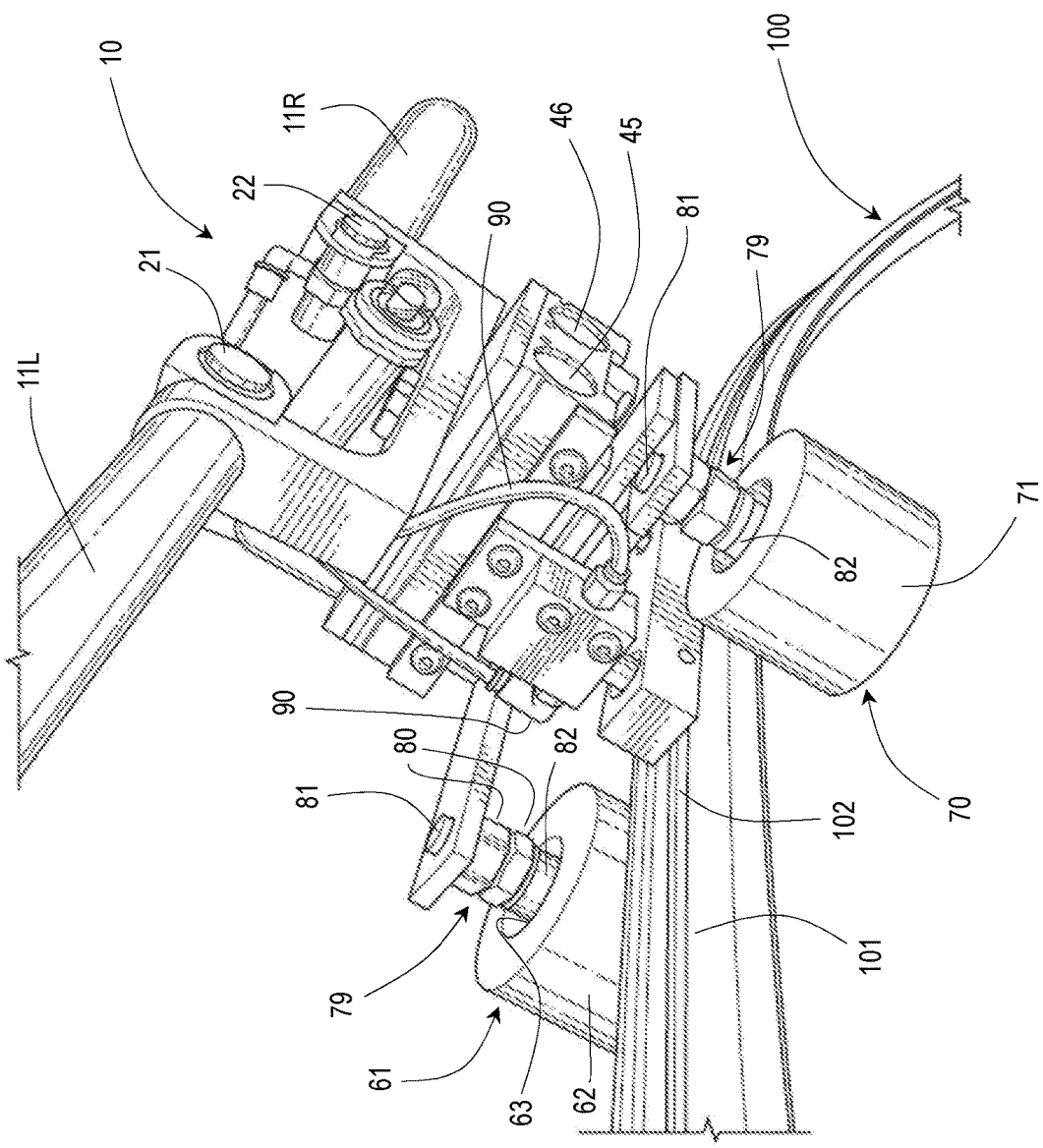
FIG. 3 is a left perspective view of a alternate embodiment of a garnish installing apparatus on a door of a vehicle in accordance with principles of the disclosed subject matter.

Referring to FIG. 3, the first static guide roller 61 can include an attachment element 63 for attaching to the axle assembly 79. For example, the attachment element 63 can be a bearing assembly provided within the static guide roller 61. Similarly, the second static guide roller 65 can be provided with an attachment element. The attachment element of the second static guide roller 65 is obstructed from view in the drawing figures. The attachment element of the second static guide roller 65 can be identical to the attachment element 63. The clamping guide roller 70 can also be provided with such an attachment element 72.

Each of the static guide roller 61, the static guide roller 65, and the clamping guide roller 70 can be supported by an axle assembly 79. The axle assembly 79 can include a pair of nuts 80, 1 threaded stud 81 and a bearing assembly 82. The bearing assembly 82 can rotatably support the respective guide roller 61, 65, 70 on the threaded stud 81. The static guide roller support 36 can include a pair of threaded holes and the extension arm 47 can include a threaded hole into which a respective threaded stud 81 is mounted. The position of the rollers 61, 65 70 relative to center alignment block 51 can be adjusted by screwing the threaded studs 81 toward of away from the respective threaded hole. The nuts 80 can be tightened against the respective one of the static guide roller support 36 and the extension arm 47 and tightened against teach other to securely hold the thread stud 81 in the desired position.

As shown in FIG. 1, the clamping guide roller 70 can be supported by such an axle assembly 79. The axle assembly 79 can be supported by an extension arm 47. The extension arm 47 can in turn be attached to a slide truck 42. The slide truck 42 can be actuated for movement on a slide rail 41. The slide truck 42 can be actuated by a pneumatic actuator assembly contained inside the housing 30. For example, the two pneumatic pistons and cylinders can be provided on both sides of the slide truck 42 so as to eliminate binding of the slide truck 42, on the slide rail, 41 and so as to provide smooth actuation. FIG. 3 shows an exemplary layout for the pneumatic actuator assembly that can include a pair of pneumatic cylinders 45, 46 with the corresponding pistons contained within the housing 30.

Figure 4:
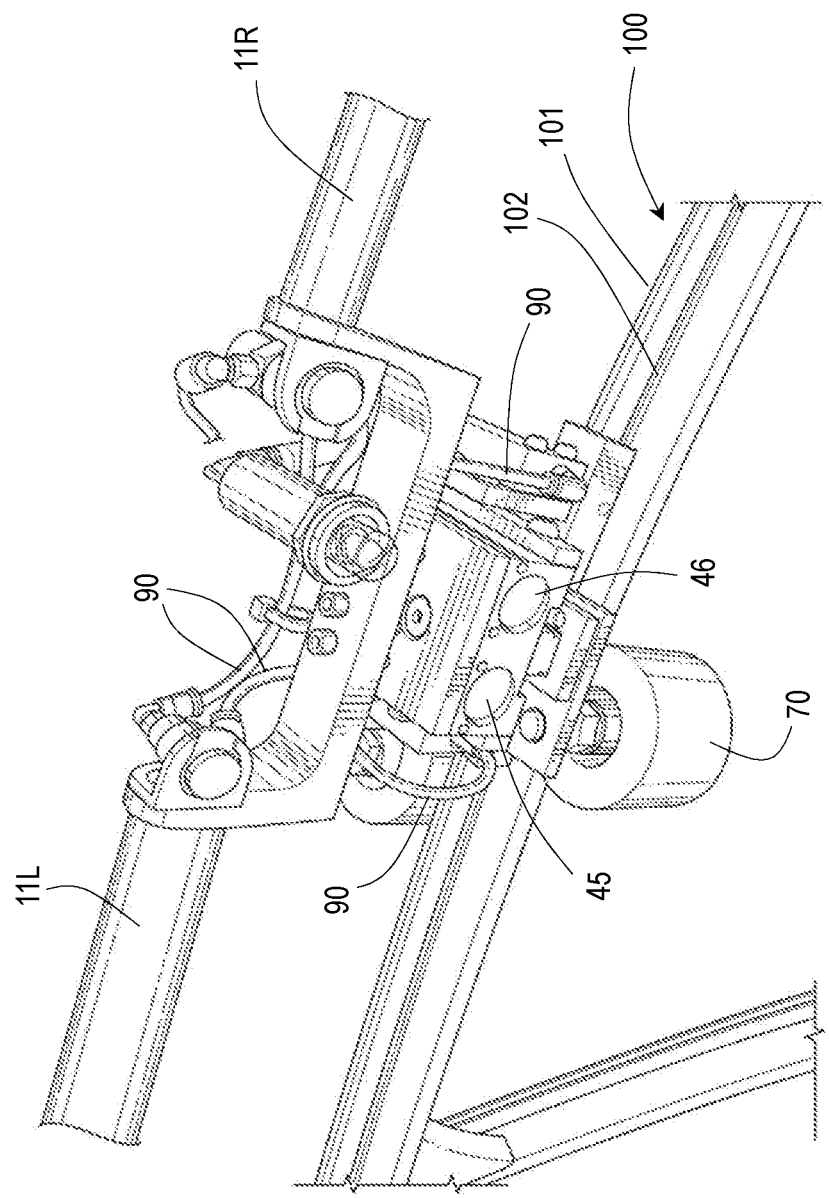
FIG. 4 is a alternate perspective view of the garnish installing apparatus shown in FIG. 3.

As shown in FIG. 4, the slide rail 41 can include slide grooves 43. The slide grooves 43 can receive matching or mating ribs that extend along the slide truck 42. Such arrangement can provide for secure and slidable connection between the slide rail 41 and the slide truck 42.

Accordingly, by actuation of the slide truck 42 along the slide rail 41, the clamping guide roller 70 can be actuated relative to the static guide rollers 61, 65. Actuation of the slide truck 42 can be controlled by the controller 31. Accordingly, a clamping force can be selectively engaged or disengaged, as controlled by the controller 31. More specifically, in operation of the garnish installing apparatus 10, the garnish installing apparatus 10 can be positioned to straddle the door 100 to which the garnish 102 is to be applied. The first static guide roller 61 and the second static guide roller 65 can be positioned on one side of the door 100, 200. Such side of the door might be either the inside side or the outside side. The clamping guide roller 70 can then be positioned on an opposing side of the door 100, 200. Then, in operation of the garnish installing apparatus 10, the clamping guide roller 70 can be actuated by the slide truck 42 sliding (on the slide rail 41) into or towards the housing 30. Thus, the clamping guide roller 70 is drawn toward a plane formed by the static guide rollers 61, 65. The clamping guide roller 70 can thus be retracted until the outer surface 71 engages the door 100,200 so as to provide a clamping force on the door 100, 200. Accordingly, the garnish installing apparatus 10 is clamped to the door 100, 200 and a position and/or orientation of the garnish installing apparatus 10 can be connected to the door 100, 200. Such ability to maintain the position and/or orientation allows the garnish installing apparatus to accurately run along the edge of the door 100, 200 and effectively apply pressure to a garnish 102, 202 by virtue of the center alignment block 51.

That is, hand-in-hand with the garnish installing apparatus 10 being clamped to the door, the center alignment block 51 can be oriented and apply appropriate pressure so as to mount the garnish 102 to the door sash 101, 201.

The center alignment block 51 can be supported on both ends or at other location(s) along the length of the center alignment block 51. Specifically, one end of the center alignment block 51 can be attached to the first pressure sensor 52 via a connection assembly 53. Another end of the center alignment block 51 can be attached to a second pressure sensor 57 via a connection assembly 58. The pressure sensors 52, 57 can in turn be supported by the housing 30 utilizing suitable brackets or other support structure. As shown in FIG. 1, for example, the pressure sensors 52, 57 can be supported by side supports 37, which extend along housing 30, and sensor supports 38.

The center alignment block 51 can be supported or float on the pressure sensors 52, 57. The connection assembly 53 can include a rod that is positioned within the pressure sensor 52. The rod can be maintained in position, but movable, by pneumatic pressure, suitable springs or other arrangement. For example, the rod can include a piston upon which air pressure is exerted, and balanced, on both sides. Thus, pressure applied to the center alignment block 51 will result in a displacement of the piston. This displacement can be sensed by the sensor 52, 57. Thus, position of the rod relative to a housing of the sensor 52 can be ascertained. As a result, a pressure exerted upon the center alignment block can be monitored by the controller. The pressure sensors 52, 57 can include similar structure and arrangement.

Accordingly, the pressure sensors 52, 57 can provide an arrangement in which the controller 31 can ascertain whether a human operator, for example, is applying an appropriate amount of pressure to the garnish installing apparatus 10 for application of a garnish. The desired pressure can be in the form of a window or range of pressures that are acceptable. If the operator applies too little pressure, the controller 31 can determine such situation and will not go to the ready state. If the operator applies too much pressure, the controller 31 can determined such situation and will not go to the ready state. Additionally, if the controller senses that the left button sensor 21 and the right button sensor 22 are not engaged, then the controller 31 can also not go to the ready state.

Accordingly, the controller 31 can determine a ready state that pressure on the center alignment block 51 is in an acceptable range based on the pressures sensed by both the pressure sensors 52,57 and that the buttons 21, 22 are engaged by the operator. Upon observing such ready state, the garnish installing apparatus 10 can retract the clamping guide roller 70 toward the static guide rollers 61, 65. Thus, the door 100, 200 will be clamped by the garnish installing apparatus 10. At this point, the garnish installing apparatus 10 is in an operational state so long as the appropriate pressure upon the center alignment block 51 is maintained and the buttons 21, 22 remain pressed. The operator can move the garnish installing apparatus along a length of the garnish 102, 202 after the garnish 102, 202 is placed in position on the door sash 101, 201. As described above, the garnish installing apparatus 10 can be provided with a ready indicator light 23 and a bulb 24, so as to provide indication to the operator that the apparatus 10 is clamped onto the door 100, 200.

Upon a situation that the operator releases pressure on the garnish installing apparatus 10, the ready state will be terminated and the clamping guide roller 70 unclamped from the door 100, 200. The operator can then observe such situation and adjust pressure being applied to the garnish installing apparatus 10. Upon a ready state being determined again, as described above, the operator can continue along the length of the garnish 102, 202, i.e. moving the garnish installing apparatus 10 along the length of the garnish 102, 202 so as to snap or place the garnish 102, 202 into place.

As shown in FIG. 1, for example, the first static guide roller 61 can be positioned on a first side of the housing 30, and the second static guide roller 65 can be positioned on a second side of the housing 30. In other words, the two rollers 61, 65 can be positioned on opposing sides of the housing 30. Additionally, the clamping guide roller 70 can be positioned on a third side of the housing. Such arrangement provides for two points of connection on one side of a door 100, 200 and one point of connection on the other side of the door 100, 200. Thus, the roller 61, 65, 70 can form a triangle.

As described above, operation of the garnish installing apparatus 10 can be controlled and monitored by the controller 31. The controller 31 can be i one or more computer processors and database or other data memory storage. The controller 31 can include one or more switches. Such switches can identify a ready state based on the various inputs from the sensors 21, 22, 57, 58 as described above.

The pressure sensors 52, 57 can include pneumatic sensors and/or arrangements as described above. Additionally, the left-hand button sensor 21 and the right hand button sensor 22 can be pneumatic sensors. Additionally, the slide truck 42 can be actuated by the first pneumatic cylinder 45 and the second pneumatic cylinder 46. In some embodiments, a single pneumatic cylinder can be utilized. Accordingly, the garnish installing apparatus 10 can be operated using pneumatic pressure. It should be appreciated that any number of pneumatic lines or hoses 90 can be utilized so as to provide the needed air pressure for the various components to operate. For example, one or two hoses 90 may be provided for operation of the various pneumatic components. In the situation were only one hose 90 is utilized, i.e. air pressure is provided to actuate the particular element in only one direction, then a spring bias can be utilized so as to actuate the element in the opposite direction.

Thus, the apparatus 30 can enhance the operator's ability to apply an appropriate force to the trim panel that can provide a desired connection to the door. Further, the apparatus 30 more efficiently transfer the operator's installation force onto the door trim. Further still, the apparatus 30 can enhance the operator's repeatedly ability of apply the appropriate installation force. Thus, the assembly process for the door trim can be improved in both process time and reliability.

While certain embodiments of the invention are described above, it should be understood that the invention can be embodied and configured in many different ways without departing from the spirit and scope of the invention.

The clamping guide roller 70 described above can be actuated by the application and removal of pneumatic pressure on a piston inside a cylinder. However, alternate embodiments can include any type of actuation mechanism. For example, the clamping guide roller 70 can be actuated by a linear solenoid. Alternate embodiments can include an electric servo motor that drives a ball and screw mechanism in or to displace the clamping guide roller 70 toward and away from the door.

As described above, the garnish installing apparatus 10 includes a left-hand button sensor 21 and a right hand button sensor 22. In some embodiments, only one button sensor may be utilized. Also, in some embodiments the center alignment block 51 might be supported by only one pressure sensor 52 and omit the second pressure sensor 57. In other embodiments, more than two pressure sensors 52, 57 can be utilized.

The various components as described above and shown in the drawings can be attached together using screws, bolts, other mechanical fasteners, welding, soldering, heat bonding, or other attachment mechanisms.

As is shown in FIG. 1, the controller 31 can be a part of or accessible via the housing top 32. However, in other embodiments such as shown in FIG. 4, the controller 31 can be totally enclosed within the housing 30. In other embodiments, the controller 31 can be fully separate from the housing 30. In such situation, the controller can be connected to the housing and various components of the garnish installing apparatus utilizing suitable wires and/or connected wirelessly.

Additionally, the embodiment of FIG. 1 can differ from the embodiment of FIG. 3 in terms of positioning or arrangement of the pneumatic cylinders 45, 46. In some embodiments, the pneumatic cylinders 45, 46 can be accessible from outside housing 30 for ease of maintenance. In other embodiments, the housing top 32 may need to be removed from the housing 30 so as to access the pneumatic cylinders 45, 46 as well as other components of the pressure assembly 50, i.e. such assembly providing the actuation of the slide truck 42 on the slide rail 41.

As described above, a ready state of the garnish installing apparatus 10 is conveyed to the operator by the illumination of a ready indicator light 23. Other communication mechanisms can be utilized. For example, an audio signal could be generated so as to alert the operator that the garnish installing apparatus 10 is in the ready state or is not in the ready state. Additionally, a further light could be provided so as to alert the operator that the garnish installing apparatus 10 is not in a ready state. Additionally, indicator lights could be provided to indicate whether the sensor 52 and/or the sensor 57 is subject to the appropriate amount of pressure. For example, it could be helpful to an operator to know which sensor 52, 57 is not receiving the appropriate amount of pressure.

The exemplary axles 79 are connected to the respective one of the static guide roller support 36 and the extension arm 47 by a threaded stud 81. However, the axles 79 can be connected to the static guide roller support 36 and the extension arm 47 in any appropriate manner such as but not limited to welding, rivets, staking, snap ring(s), etc.

Features, elements and/or characteristics described with respect to one embodiment of the disclosure may be variously used with other embodiments of the disclosure as may be desired.

Various components of embodiments of the disclosure can be made from any of a variety of materials including, for example, steel, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques can be utilized. Also, metal stamping or cutting can be utilized.

What is claimed is:

1. A garnish installing apparatus comprising:
a housing that includes a housing body and an extension mechanism that is movable relative to the housing body, the extension mechanism includes a pneumatic cylinder;
first and second static guide rollers attached to the housing,
an adjustable guide roller attached to the extension mechanism,
the adjustable guide roller is configured to provide a clamping force, with the static guide roller, on a door of a vehicle;
a pressure assembly configured to apply pressure and detect application of pressure to a garnish of the door, and
the pressure assembly includes a pneumatic sensor;
a left handle,
a right handle,
a left hand button sensor positioned adjacent the left handle, and
a right hand button sensor positioned adjacent the right handle, wherein
the first static guide roller is positioned on a first side of the housing,
the second static guide roller is positioned on a second side of the housing,
the adjustable guide roller is positioned on a third side of the housing, such that the first static guide roller, the second static guide roller, and the adjustable guide roller form a triangle, and
the left hand button sensor and the right hand button sensor are each configured to detect pressing by an operator to enable operation of the garnish installing apparatus.

2. The garnish installing apparatus of claim 1, wherein the garnish installing apparatus is configured to straddle the door with (a) the first static guide roller and the second static guide roller on one side of the door, and (b) the adjustable guide roller on an opposing side of the door.

3. The garnish installing apparatus of claim 2, wherein the pressure assembly includes an alignment block, a first pressure sensor, and a second pressure, and
the alignment block is supported by the first pressure sensor and the second pressure sensor, and the first pressure sensor and a second pressure sensor collectively apply the pressure and detect application of pressure.

4. The garnish installing apparatus of claim 1, wherein the pressure assembly includes an alignment block, a first pressure sensor, and a second pressure, and
the alignment block is supported by the first pressure sensor and the second pressure sensor, and the first pressure sensor and a second pressure sensor collectively apply pressure and detect application of pressure.

5. The garnish installing apparatus of claim 4, wherein the alignment block includes an elongated block that extends across an underside of the housing.

6. The garnish installing apparatus of claim 1, further comprising a controller, and
the controller is configured to determine a ready state by:
detecting a predetermined pressure range in said detecting application of pressure,
detecting that the left hand button sensor has been depressed by the operator, and
detecting that the right hand button sensor has been depressed by the operator.

7. The garnish installing apparatus of claim 6, further comprising a ready indicator light, and
wherein the controller, upon detecting the ready state, is configured to light up the ready indicator light.

8. The garnish installing apparatus of claim 1, wherein the extension mechanism includes:
a slide rail attached to the housing body,
a slide truck attached to the adjustable guide roller, and the slide truck is slidably disposed on the slide rail so as to be movable, by actuation of the extension mechanism, between an unclamped position and a clamped position, and the guide static guide roller and the adjustable guide roller apply the clamping force when garnish installing apparatus is placed on the door and the slide truck is in the clamped position; and
the actuation of the extension mechanism is provided by the pneumatic cylinder.

9. A garnish installing apparatus comprising:
a housing that includes a housing body and an extension mechanism that is movable relative to the housing body, the extension member includes a pneumatic cylinder;
first and second static guide rollers attached to the housing;
at least one adjustable guide roller attached to the extension mechanism,
the at least one adjustable guide roller is configured to apply a clamping force, with the first and second static guide rollers, on a door of a vehicle;
a pressure assembly configured to apply pressure and detect application of pressure to a garnish of the door, the pressure assembly includes:
at least one pressure sensor that is supported by the housing body; and
a block that is supported by the at least one pressure sensor, and the block is configured to physically apply pressure to the garnish; and
a controller configured to control operations of the garnish installing apparatus including detecting an predetermined application of pressure, on the block, as a trigger for providing the clamping force; and
a handle provided with a further sensor, and the further sensor is configured to detect operator engagement, and such operator engagement also being a trigger, detected by the controller, for providing the clamping force, wherein
the first static guide roller is positioned on a first side of the housing,
the second static guide roller is positioned on a second side of the housing, and
the adjustable guide roller is positioned on a third side of the housing, such that the first static guide roller, the second static guide roller, and the adjustable guide roller form a triangle.

10. The garnish installing apparatus of claim 9, wherein the at least one pressure sensor is a pair of pressure sensors.

11. The garnish installing apparatus of claim 9, wherein the extension mechanism includes:
   a first slide element attached to the housing body, and
   a second slide element, which engages with the first slide element, attached to the adjustable guide roller.

12. A garnish installing apparatus comprising:
   a housing that includes a housing body and an extension mechanism that is movable relative to the housing body, the extension member includes a pneumatic cylinder;
   first and second static guide rollers attached to the housing body;
   an adjustable guide roller attached to the extension mechanism,
      the adjustable guide roller is configured to provide a clamping force, with the first and second static guide rollers, on a door of a vehicle, and the clamping force is provided by actuation of the extension mechanism; and
   a pressure assembly configured to apply pressure and detect application of pressure to a garnish of the door, the pressure assembly include:
      a first pressure sensor and a second pressure sensor that are supported by the housing body; and
      a block that is supported by the first and second pressure sensors, and the block is configured to physically apply pressure to the garnish; and
      a handle provided with a further sensor, and the further sensor is configured to detect operator engagement; and
   a controller configured to control operations of the garnish installing apparatus, including detecting a ready state that includes:
      an application of a predetermined pressure, by the block, to the garnish; and
      a detection of operator engagement by the further sensor, wherein
   the first static guide roller is positioned on a first side of the housing,
   the second static guide roller is positioned on a second side of the housing, and
   the adjustable guide roller is positioned on a third side of the housing, such that the first static guide roller, the second static guide roller, and the adjustable guide roller form a triangle.

13. The garnish installing apparatus of claim 12, further comprising a light, and the controller is configured to control the light to light upon the ready state being attained.

14. The garnish installing apparatus of claim 12, wherein the controller is configured to control the clamping force upon the ready state being attained.

* * * * *